US00RE39790E

(19) United States
(12) Reissued Patent
Fuchs et al.

(10) Patent Number: US RE39,790 E
(45) Date of Reissued Patent: Aug. 21, 2007

(54) REFLECTOR WITH RESISTANT SURFACE

(75) Inventors: Roman Fuchs, Neuhausen (CH); Gerhard Schottner, Heilsbronn (DE); Johannes Martin Sandrock, Göttingen (DE)

(73) Assignee: Alcan Technology & Management Ltd., Neuhausen am Rheinfall (CH)

(21) Appl. No.: 09/898,167

(22) Filed: Jul. 5, 2001

Related U.S. Patent Documents

Reissue of:
(64) Patent No.: 5,919,561
Issued: Jul. 6, 1999
Appl. No.: 08/902,964
Filed: Jul. 30, 1997

(30) Foreign Application Priority Data

Aug. 15, 1996 (CH) ..... 2001/96
Sep. 3, 1996 (CH) ..... 2165/96

(51) Int. Cl.
*B32B 15/08* (2006.01)

(52) U.S. Cl. ..... 428/336; 428/215; 428/216; 428/450; 428/912.2

(58) Field of Classification Search ..... 428/215, 428/216, 332, 334, 335, 336, 450, 912.2
See application file for complete search history.

(56) References Cited

U.S. PATENT DOCUMENTS 3,274,078 A * 9/1966 Tsuji ..... 205/201
4,457,587 A * 7/1984 Katayama et al. ..... 359/883
5,356,492 A * 10/1994 Miller ..... 148/273

FOREIGN PATENT DOCUMENTS

| | | |
|---|---|---|
| EP | 0 358 011 | * 3/1990 |
| EP | 0 495 755 | * 7/1992 |
| EP | 0 568 943 | * 11/1993 |
| EP | 0 610 831 | * 8/1994 |
| FR | 1247882 | * 10/1960 |
| GB | 890465 | * 2/1962 |

* cited by examiner

*Primary Examiner*—D. S. Nakarani
(74) *Attorney, Agent, or Firm*—Fisher, Christen & Sabol

(57) ABSTRACT

Reflectors, for example, for lamps used for technical lighting purposes, having a surface which is resistant to mechanical and chemical attack and has high total reflectivity. The body (10) of the reflector, which is, for example, a rolled aluminum product such as a foil, a strip of a sheet, has a surface layer in the form of a layer system containing (a) a pretreatment layer (11), onto which is deposited (b) a functional layer (12) with silanes, having organo-functional groups, of a metal compound, and onto which is deposited (c) a metal-containing reflective layer (13). Layer (a) is deposited on the reflector body and increases the strength of bonding to the above lying layers (a) and (b). Layer (b) effects a flattening and increase in the mechanical strength of the above lying layer (c). The pretreatment layer can be a layer produced by anodic oxidation. The functional layer (b) can be a sol-gel layer. The reflective layer (c) can be a metallic reflective layer, in some cases with one or more protective layers, which are deposited, e.g., by vacuum thin layer deposition process.

15 Claims, 1 Drawing Sheet

REFLECTOR WITH RESISTANT SURFACE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a reflector having, on a reflector body, a surface which is resistant to mechanical and chemical attack and exhibits high total reflectivity. The invention relates also to a process for its manufacture and the use of such reflectors with a resistant surface layer.

2. Background Art

Known is the production of bright finish strips e.g. of high purity aluminium or AlMg alloys based on aluminium having a purity of 99.8% and higher, such as e.g. 99.9%, and roll surfaces that produce diffuse or directionally reflected light depending on the application. To increase the directional reflectivity (degree of brightness) of such strips, it is also known to brighten the strips chemically or electrolytically, then to create a e.g. 1.5 μm thick protective layer by anodic oxidation.

Anodising processes are chemical treatments which suffer the disadvantage of requiring considerable precaution in order to avoid contamination of the environment The extent of these precautions increases with increasing thickness of the oxide layer.

The known processes have the further disadvantage that high purity, expensive bright-finish alloys based on aluminium of very high purity have to be employed. As a result of the anodising process, the degree of reflectivity of the surface, and with that both the total reflectivity and the directional reflectivity is lowered due to absorption and diffuse scattering of light, in particular in the oxide layer. This represents a loss in energy.

Known from EP-A-0 495 755 are objects with surfaces of aluminium which are suitable for the precipitation of layer systems from the gas phase onto these surfaces. Anodising the surface is dispensed with and the layer system described involves e.g. a bonding layer, such as a ceramic layer, a light-reflecting layer, such as a metallic layer e.g. of aluminium, and one or more transparent protective layers of metallic compounds. Such layer systems exhibit a high degree of reflectivity and the disadvantages of anodising are avoided. Such a layer system, however, suffers the disadvantage that the surfaces are very sensitive to physical attack, such as mechanical or chemical attack e.g. by corrosive media.

EP-A-0 568 943 describes the precipitation of a reflective layer on the basis of aluminium or an aluminium alloy and a gel film which has been deposited on the aluminium by means of a sol-gel process. This is also a possible way of arriving at reflective aluminium materials without having to employ anodising; the layered structure described in EP-A-0 568 943 is, however, not resistant to mechanical effects and corrosion to the extent desired.

BROAD DESCRIPTION OF THE INVENTION

The object of the present invention is to avoid the above mentioned disadvantages and to propose reflectors which exhibit a reflectivity enhancing layer on their surface or part thereof. The aluminium substrate and in particular the reflectivity enhancing layer should be extremely resistant to physical influences such as mechanical damage and chemical attack e.g. corrosion.

That objective is achieved by way of the invention in that the reflector body features as surface layer a layer system comprising a) a pre-treatment layer, on which is deposited b) a functional layer having organo-functional silanes of a metal compound, on which is deposited c) a metallic reflective layer, where layer a) is deposited on the reflector body and increases the strength of bonding to the layers lying above it, and layer b) effects a flattening and an increase in the mechanical strength of the above lying layer c).

DETAILED DESCRIPTION OF THE INVENTION

All three-dimensional shapes which exhibit at least one free surface of a metal such as aluminium or an aluminium alloy may be employed as the body of the reflector. This free surface is for example aluminium with a purity of 98.3% and higher, in some cases a purity of usefully 99.0% and higher, preferably 99.9% and higher and in particular 99.95% and higher. Apart from aluminium of the above mentioned purities, the surface may also be an alloy. Preferred alloys are those of the AA 1000, AA 3000 and AA 5000 type. Further preferred alloys contain for example 0.25 to 5 wt. % magnesium, in particular 0.5 to 4 wt. % magnesium, or contain 0.2 to 2 wt. % manganese or contain 0.5 to 5 wt. % magnesium and 0.2 to 2 wt. % manganese, in particular e.g. 1 wt. % magnesium and 0.5 wt. % manganese, or contain 0.1 to 12 wt. % copper, preferably 0.1 to 5 wt. % copper, or contain 0.5 to 6 wt. % zinc and 0.5 to 5 wt. % magnesium, or contain 0.5 to 6 wt. % zinc, 0.5 to 5 wt. % magnesium and 0.5 to 5 wt. % copper, or contain 0.5 to 2 wt. % iron and 0.2 to 2 wt. % manganese, in particular e.g. 1.5 wt. % iron and 0.4 wt. % manganese or AlMgSi alloys or AlFeSi alloys.

Especially preferred surfaces are for example of aluminium with a purity of 99.5% and higher, 99.8% and higher, or surfaces of an aluminium alloy containing 0.5 wt. % magnesium, or containing 1 wt. % magnesium, or containing aluminium with a purity of 99% and 5 to 10 wt. % magnesium, in particular 7 wt. % magnesium and 6 to 12 wt. % copper, in particular 8 wt. % copper. Especially preferred are also all aluminium alloys that can be rolled.

Examples of reflector bodies are cast parts and forged parts, in particular rolled products such as foils, strips, plates, sheets, which if desired may be shaped by bending, deep drawing, cold forming and the like. Further, profiled sections, beams or other shapes may be employed. Depending on the application, the whole reflector may be of the above mentioned aluminium or aluminium alloy, or only parts thereof or surface regions may be of that material.

The above mentioned aluminium or aluminium alloy may also be part of a composite, whereby it then constitutes at least one surface or only part of a surface e.g. of a composite foil or foil-laminate, or another substrate of any material of choice such as e.g. plastic, metal such as Al-coated iron or steel sheet, or ceramic.

The aluminium surfaces may e.g. be produced by chemical and/or mechanical forming of the surface e.g. rolling, cold-forming, extrusion or casting followed by an after-treatment in the form of grinding, polishing, shot-peening with hard materials etc. The surfaces may be cleaned e.g. between individual, multiple or all rolling passes, this in particular to remove rolling fines. The cleaning of the surface may take place by conventional means e.g. chemically and/or electrochemically and acidic or alkaline.

Preferred reflector bodies are aluminium sheets or Al-coated iron or steel sheet with a thickness of e.g. 0.2 to 0.8 mm, usefully 0.3 to 0.7 mm, advantageously 0.5 mm. One example is an 0.5 mm thick, A4 aluminium sheet of A1 99.5 (99.5% purity). If structured roll surfaces are to be used, then the surface of the roll may be structured e.g. by turning, grinding, engraving also by hand, by electron beam erosion, by laser beam erosion, by electrolytic erosion or by blasting/peening with hard media.

The aluminium surfaces may also be subjected to a chemical or electrochemical brightening process or to an alkaline pickling process. Such brightening or pickling processes are employed prior to anodising.

The aluminium surfaces may exhibit a surface roughness $R_a$ e.g. of 0.01 to 5 μm, preferably from 0.01 to 0.5 μm. Further advantageous, preferred degrees of roughness $R_a$ are from 0.01 to 0.4 μm, in particular from 0.03 to 0.06 μm, whereby 0.04 μm is highly preferred. The surface roughness $R_a$ is defined in at least one of the DIN standards 4761 to 4768.

In accordance with the invention the present reflector features between the reflector body and the reflective layer c) intermediate layers viz., layer a) a pre-treatment layer e.g. in the form of a layer of anodically oxidised aluminium, and a layer b) in the form of a functional coating with organo-functional silanes of a metal compound e.g. in the form of a sol-gel layer.

The pre-treatment layer a) may e.g. be a layer produced by chromate treatment, phosphate treatment or by anodising. The pre-treatment layer is preferably of anodically oxidised aluminium and is in particular created directly from the aluminium on the surface of the reflector body. The pre-treatment layer a) may have a thickness e.g. of at least 20 nm, usefully at least 50 nm, preferably at least 100 nm, in particularly preferably at least 150 nm (nanometer). The greatest thickness of the pre-treatment layer a) may be e.g. 1500 nm, preferably 200 nm (nanometer). The pre-treatment layer therefore is preferably 100 to 200 nm thick.

For example, the pre-treatment layer a) may be an oxide layer produced by anodising which is formed in an a re-dissolving or a non-re-dissolving electrolyte. The pre-treatment layer a) may also be a yellow chromate layer, a green chromate layer, a phosphate layer or a chrome-free pre-treatment layer which has grown in an electrolyte containing at least one of the elements Ti, Zr, F, Mo or Mn.

The production of a preferred anodic oxide layer, such as on an aluminium layer requires e.g. a clean aluminium surface, i.e. an aluminium surface that is to be anodised must normally be subjected to a so-called surface pre-treatment prior to electrolytic oxidation.

Aluminium surfaces normally exhibit a natural oxide layer which, as a result of their previous history are often contaminated by foreign particles. Such foreign particles may be e.g. residue from rolling lubricants, protective oils for transportation, corrosion products or pressed-in foreign particles and the like. In order to remove such foreign particles, the aluminium surfaces are normally chemically pre-treated with cleaning agents that effect a certain degree of attack. Apart from acidic aqueous solutions, alkaline degreasing agents based on polyphosphate and borate are particularly suitable for that purpose. Pickling or etching with a strongly alkaline or acidic solution such as e.g. caustic soda solution or a mixture of nitric acid and fluoric acid effects cleaning with moderate to pronounced removal of material. In that process the natural oxide layer and all the contaminants embedded in it are removed. When using aggresive alkaline pickling solutions, a deposit of smut is often produced and has to be removed by subsequent treatment with acid. Organic solvents or aqueous or alkaline cleaners degrease the surface without removing any of the surface layer.

Further cleaning methods are degreasing the aluminium surface by plasma-oxidation, corona discharge or cleaning in an inert gas plasma such as Ar, He, Ne, $N_2$ etc.

Depending on the condition of the surface it may also be necessary to remove some of the surface by mechanical means using abrasive materials. Such a surface pre-treatment may be performed e.g. by grinding, blasting/peening, brushing or polishing, if necessary followed by a chemical pre-treatment.

The further treatment for anodic oxidation is such that the reflector body—at least the part of the aluminium layer to be anodise—is subsequently placed in an electrically conductive fluid, the electrolyte, and connected up to a direct current source as the anode, the negative electrode normally being stainless steel, graphite, lead or aluminium.

In the case of a non-re-dissolving electrolyte, the electrolyte may be made such that it does not chemically dissolve the aluminium oxide formed during the anodising process i.e. there is no re-solution of the aluminium oxide. In the direct current field gaseous hydrogen is formed at the cathode and gaseous oxygen at the anode. The oxygen formed at the aluminium surface reacts with the aluminium and forms an oxide layer which grows in thickness during the process. As the resistance of the layer increases rapidly with increasing thickness of the barrier layer, the flow of current falls accordingly and the layer ceases to grow further.

The electrolytic production of such layers a) allows the thickness of the layer to be regulated very precisely. The maximum thickness of aluminium oxide barrier layer achieved is in nanometers (nm) approximately the value of the applied voltage (V), i.e. the maximum thickness of layer is linearly dependent on the anodising voltage—whereby the voltage drop at the outer layer has to be taken into consideration. The exact value of the maximum layer thickness achieved as a function of the applied direct voltage U and—taking into account the voltage drop at the outer layer—can be determined by a simple trial and lies in the region of 1.2 to 1.6 nm/V. The exact value of layer thickness is a function of the applied voltage, the electrolyte used i.e. its composition and its temperature.

In order to take into account the changing drop in voltage at the outer layer during the process, the anodising voltage may be increased continuously or stepwise during the process. The optimum anodising voltage, or the optimum series of voltages throughout the process and the duration of anodising, may be determined by means of simple trials or by measuring the reflectivity during the anodising process.

The electrolytic oxidation may be carried out in one single step by applying a pre-defined anodising voltage or by continuously or stepwise increasing the anodising voltage to a predetermined value or to a value which is determined by measuring the optimum reflectivity properties. The electrolytic oxidation may, however, be performed in a plurality of steps, i.e. in several process steps e.g. applying different anodising voltages.

For example on employing a non-re-dissolving electrolyte the aluminium oxide barrier layers are almost pore-free i.e. any pores formed are a result e.g. of contaminants in the electrolyte or structural faults in the aluminium surface layer. This is only insignificant, however, as a result of re-solution of the aluminium oxide by the electrolyte.

Layers a) produced this way can be produced with a precisely prescribed layer thickness, pore-free, homogenous, and with regard to the electromagnetic radiation, transparent, in particular in the visible and/or infra-red range.

Organic or inorganic acids, as a rule diluted with water may be used as non-re-dissolving electrolytes for this process; these have a pH value of 2 and more, preferably 3 and more, in particular 4 and more and 7 and less, preferably 6 and less, especially 5.5 and less. Preferred are cold electrolytes i.e. electrolytes functioning at room temperature. Especially preferred are inorganic or organic acids such as sulphuric acid or phosphoric acid at low concentrations, boric acid adipinic acid citric acid or tartaric acid, or mixtures thereof, or solutions of ammonium salts or sodium salts and their mixtures. Of particular value here are the solutions preferably with a total concentration of 20 g/l or less ammonium salt or sodium salt, usefully 2 to 15 g/l thereof dissolved in the electrolyte. Very highly preferred thereby are solutions of ammonium salts of citric acid or tartaric acid or sodium salts of phosphoric acid.

A very highly preferred electrolyte contains 1 to 5 wt. % tartaric acid, to which may be added a corresponding amount of ammonium hydroxide ($NH_4OH$) to adjust the pH value to the desired level.

The electrolytes are as a rule aqueous solutions.

The maximum anodising voltage that may be applied is determined by the dielectric constant of the electrolyte. This is e.g. dependent on the composition and temperature of the electrolyte and normally lies in the range of 300 to 600 V.

The optimum temperature for the electrolyte depends on the electrolyte being used; it is, however, in general of secondary importance with respect to the quality of the layer c). Electrolyte temperatures of 15 to 40° C., in particular 18 to 30° C., are preferred for anodising.

Preferred is an anodic oxide layer produced by anodising in a non-re-dissolving electrolyte and not sealed.

Re-dissolving electrolytes that may be employed are e.g. inorganic or organic acids—as a rule diluted with water—such as sulphuric acid, phosphoric acid, oxalic acid, chromic acid etc. and combinations thereof. The anodising voltage which is applied to the surface to be anodised as direct current or alternating current is normally selected such that current densities of approx. 0.1 to 10 $A/dm^2$ are obtained on the surface. The porous structures that are obtained with re-dissolving electrolytes may subsequently be sealed in hot water or steam, with or without chemical additions. Particularly tight-bonding surfaces are obtained, however, with anodic oxide layers that have not been sealed, but have instead only been rinsed with water and dried.

A particularly suitable anodisation process for use with a re-dissolving electrolyte is the so-called dc-$H_2SO_4$ process without sealing.

Layer a), the aluminium oxide layer produced by anodic oxidation, may be at least 20 nm (nanometer) thick, usefully 50 nm and more, preferably 100 nm and more and advantageously 150 nm and more. The thickness of the aluminium oxide layer a) produced by anodising is, for reasons of costs and the amount of electrolyte waste produced, for example at most 1500 nm, preferably at most 200 nm. The preferred thickness of the aluminium oxide layer produced by anodising is therefore 100 to 200 nm.

The oxidation of the aluminium surface may also be achieved by corona pre-treatment and dry oxidation.

Layer b), a functional coating with organo-functional silanes of a metal compound e.g. in the form of a sol-gel layer is deposited on layer a).

For example layer b) is 0.5 to 20 μm thick, usefully 1 to 20 μm, preferably 2 to 10 μm thick; highly preferred is a thickness of 2 to 5 μm.

The functional coating b) with organo-functional silanes of a metal compound may have been obtained e.g. by hydrolitic condensation of the following components, if desired in the presence of a condensation catalyst and/or normal additives:

1. at least one cross-linkable organo-functional silane of formula (II):

$$R'''_m SiX_{(4-m)} \quad \text{(II)}$$

in which groups X, which may be the same or different, stand for hydrogen, halogen, alkoxy, acyloxy, alkylcarbonyl, alkoxycarbonyl or —NR"2 (R"=H and/or Alkyl) and the radicals R'", which may be the same or different represent alkyl, alkenyl, alkinyl, aryl, arylalkyl, alkylaryl, arylalkenyl, alkenylaryl, arylalkinyl or alkinylaryl, whereby these radicals may be interrupted by O- or S-atoms or the group —NR" and may bear one or more substituents from the group of halogens and the possibly substituted amino, amide, aldehyd, keto, alkylcarbonyl, carboxy, mercapto, cyano, hydroxy, alkoxy, alkoxycarbonyl, sulphonic acid, phosphoric acid, acryloxy, methacryloxy, epoxy or vinyl groups and m has the value 1, 2 or 3, and /or one oligomer derived therefrom, where the radical R'" and/or the substitute must be a cross-linkable radical or substituent, in an amount of 10 to 95 mol %, referred to the total mol number of the (monomer) starting components;

2. at least one metal compound having the general formula III:

$$MeRy \quad \text{(III)}$$

in which Me stands for a metal from the following group Al, Zr, Ti, where y in the case of aluminium is 3 and in the case of Ti and Zr is 4 and the radicals R, which may be the same or different, stand for halogen, alkyl, alkoxy, acyloxy or hydroxy, where the last mentioned groups may be replaced wholly or partially by chelate ligands and/or one oligomer derived therefrom and/or if desired a complexed aluminium salt of an inorganic or organic acid in an amount of 5 to 75 mol % referred to the total mol number of the (monomer) starting components, 3. if desired at least one non cross-linkable organo-functional silane of formula I:

$$R'_m SiX_{(4-m)} \quad \text{(I)}$$

in which groups X, which may be the same or different, stand for hydrogen, halogen, hydroxy, alkoxy, acyloxy, alkylcarbonyl, alkoxycarbonyl or —NR"2 (R"=H and/or Alkyl) and the radicals R', which may be the same or different, represent alkyl, aryl, arylalky or alkylaryl, whereby these radicals may be interrupted by O- or S-atoms or the group —NR" and may bear one or more substituents from the group of halogens and the possibly substituted amide, aldehyd, keto, alkylcarbonyl, carboxy, cyano, alkoxy, alkoxycarbonyl, groups and m has the value 1, 2 or 3, and/or one oligomer derived therefrom, in an amount of 0 to 60 mol %, referred to the total mol number of the (monomer) starting components and 4. if desired with one or more non-volatile oxide of an element of the main groups 1a to Va or a sub-group IIb, IIIb, Vb to VIIIb of the periodic system which is soluble in the reaction medium, with the exception of Al, and/or one or more compound of one of these elements forming a non-volatile oxide under the reaction conditions, which is soluble in the reaction medium, in an amount of 0 to 70 mol %, referred to the total mol number of the (monomer) starting components;

carried out such;

b) that an organic pre-polymer is added to this hydrolitic condensate, whereby the reacting cross-linkable groups of the radical R''' and/or the cross-linkable substitutes on the radical R''' have the same name as the pre-polymer, and the pre-polymer is added in an amount of 2 to 70 mol % referred to the total mol number of (monomer) starting components;

c) the coating solution thus obtained is deposited on a substrate and subsequently cured. Further details and modes of preparation of the functional layers b) may be obtained from EP-A 0610831 and EP-A 0358011.

The functional layer is to advantage deposited onto the pre-treatment layer on the reflector body by means of a sol-gel process. The functional layer can be applied to the substrate by immersion, brushing, rolling, centrifugal means, spraying, so called coil coating etc. As a rule silanes are employed in the functional coating. If the silanes are partially replaced by compounds which, instead of silicon, contain titanium. zirconium or aluminium, then the hardness, density and refractive index of the functional coating can be varied. The hardness of the functional layer may likewise be regulated by employing various silanes, for example by forming an inorganic network for controlling the hardness and thermal stability, or by using an organic network to regulate the elasticity. A functional coating, that may be considered as between the inorganic and organic polymers, is deposited onto the aluminium substrates e.g. via the sol-gel process by hydrolysis and condensation of alkoxides, mainly those of silicon, aluminium, titanium and zirconium. As a result of that process an inorganic network is formed and, via corresponding derivatised siliceous esters, additional organic groups can be integrated in it and can be employed for functionalising and for creating defined organic polymer systems. Further, the sol-gel layer may be deposited also by electro-immersion coating on the principle of cataphoretic precipitation of an amine/organically modified ceramic.

After the anodised surface of the reflector body has been coated with a functional layer, the coating can be cured. The curing may be performed by radiation e.g. UV radiation, electron beam or laser beam radiation and/or at elevated temperature. The temperature may be increased by convection or thermal radiation such as infra-red radiation and/or UV radiation, or by a combination of convection and radiation such as UV and/or infra-red radiation or by means of hot gas such as hot air. The temperature, measured at the layer lying below the functional coating e.g. the metal layer, e.g. aluminium layer, is e.g. higher than 110° C., usefully higher than 150° C. and preferably between 150 and 220° C. The elevated temperature may act on the body e.g. for 10 sec. to 120 min. The convection heating may be usefully effected by striking the body with heated gases such as air, nitrogen, noble gases or mixtures thereof.

The layer b) i.e. the functional layer effects a flattening or smoothing of the surface. $R_a$ roughness values e.g. smaller than 0.01 μm, preferably smaller than 0.02 μm, are achieved. The surface roughness $R_a$ is defined in at least one of the DIN standards 4761 to 4768. The functional layer b) may be a monolayer or a multiple layer comprising e.g. two, three or more layers. These layers may all be of the same material or be of different materials, in each case selected from the materials mentioned above for the functional layer b). The multiple layer coatings i.e. two, three or more layer coatings may be deposited e.g. by depositing a first layer, pre-curing or curing this first layer, depositing the second layer and curing the second layer. A first layer that has only been pre-cured may be cured completely along with the curing of the second layer. If a third layer is to be deposited, the first and the second layer may be cured or pre-cured and the curing may be only for the third layer, or—as required—the these underlying layers may be cured along with the third layer. The same applies for further fourth or more layers. Pre-curing includes methods such as allowing the layer(s) to dry, pre-drying under the influence of heat or radiation or by radiation or thermal treatments. The useful thickness of a two or three layer coating is in the above mentioned range of 1 to 20 μm, whereby each individually deposited layer may have a thickness of 2 to 5 μm.

The reflective layer c) is a single reflecting layer and in particular a multi-layer system, whereby the multi-layer system features a reflecting layer such as e.g. of aluminium, silver, copper, gold, chromium, nickel or alloys containing e.g. mainly at least one of the above metals. The thickness of the reflective layer may e.g. be 10 to 200 nm (nanometer). one or more transparent protective layers may be deposited on this metallic layer and may be e.g. of or contain oxides, nitrides, fluorides etc. of alkali metals, alkali earth metals, semiconductors and/or transition metals and/or lanthanides. Also, two or more transparent protective layers may be provided using the above mentioned metals with different indices of refraction in order to reinforce the degree of reflection as a consequence of partial light reflection at the phase boundary of the transparent protective layers. The individual protective layers are typically *from* 1 nm thick, preferably from 40 to 200 nm thick and exhibit in particular a thickness which is a fraction e.g. $\lambda/2$ or $\lambda/4$ of the wavelength of the radiation to be reflected. Preferred is a multilayer system containing a reflective layer and at least one transparent protective layer. Preferred are multilayer systems comprising a metal reflective layer on top of which is a transparent $\lambda/4$ protective layer of low refractive index and on top of that layer a transparent $\lambda/4$ protective layer of high refractive index. Examples thereof are aluminium as reflective metal layer, $SiO_2$ or $MgF_2$ as low refractive index $\lambda/4$ layer and Ti-oxide or Ti, Pro-xide as high refractive index $\lambda/4$ layer. An even higher degree of refraction may be obtained using a plurality of $\lambda/4$ double layers alternating with low and high refractive index.

*The thickness of individual protective layers can be, for example, from 1 nm to 150,000 nm. Examples of the thickness of the individual protective layers are 1 nm, 2.5 nm, 5 nm, 40 nm, 50 nm, 100 nm, 187.5 nm, 200 nm, 375 nm, 750 nm, 1,500 nm, 7,500 nm, 15,000 nm, 75,000 nm and 150,000 nm.*

The reflective layer c) and therefore the reflecting layer or the reflecting layer and further layers of the multilayer system may be deposited on the reflector body e.g. by gas or vapour deposition in vacuum, (physical vapour deposition PVD), by thermal vaporisation, by means of electron beam vaporisation, with and without ion support, by sputtering, in particular by magnetron sputtering or by chemical gas phase deposition (chemical vapour deposition CVP) with and without plasma support.

The reflective layer c) on the reflector body via layer b) serves in particular to reflect energy in the form of waves and/or particles, usefully for reflecting radiation having wave lengths in the optical range, preferably visible light, in particular that having wave lengths of 400 to 750 nm.

The reflective layer c) on the reflector body results in particular in reflectors with coated surfaces that achieve a total reflectivity—measured according to DIN 5036—of usefully 90% and higher, in particular 94 to 96%. The reflective layer or multilayer system may e.g. be deposited on the surface in a series of process steps which includes: as required, degreasing the surface to be coated, enclosing the item bearing the surface to be coated in a vacuum unit, cleaning e.g. by sputtering, glow discharge etc., if desired depositing a bonding layer in a preliminary stage, in a first stage depositing at least at least one light-reflecting, in particular metal layer, and in a second and if desired a third, fourth etc. stage precipitation of a transparent layer or if desired two, three etc. transparent layers, then removing the coated item from the vacuum chamber.

On the reflector according to the invention there may be provided between the functional layer b) and the reflective layer c) an additional—e.g. oxide or nitride containing—bonding layer. The bonding layer may e.g. be a ceramic layer. Such layers may be of or contain e.g. compounds having the formula $SiO_x$ where x represents a number from 1 to 2, or AlyOz, where y/z is a number from 0.2 to 1.5. Preferred is a bonding layer comprising or containing $SiO_x$ where x has the above meaning. The oxide-containing bonding layer is typically 1 to 200 nm thick, preferably 1 to 100 nm thick. The oxide-containing bonding layer may be deposited on the surface according to the invention or on the previously deposited layer e.g. by gas or vapour deposition in vacuum, (physical vapour deposition), by thermal vaporisation, by means of electron beam vaporisation, with and without ion support, by sputtering, in particular by magnetron sputtering or by chemical gas phase deposition (chemical vapour deposition) with and without plasma support.

The reflectors according to the invention having surfaces that bear such a reflective layer or multilayer system exhibit excellent reflectivity for example of electromagnetic radiation, especially electromagnetic radiation in the visible light range. The optical range includes e.g. infra-red range, the visible light range, ultra violet etc. The preferred range for application is that of electromagnetic radiation and thereby the visible light range.

The reflection of the radiation may, depending on the application, be directional, scattered or a combination thereof. For that reason the reflectors according to the invention are suitable e.g. as reflectors such as those for radiation sources or optical equipment. Such radiation sources are e.g. lights such as work-place lights, primary lights, secondary lights, strip lights with transvers reflectors, light elements, lighting covers, light deflecting fins or thermal radiators. The reflectors may also e.g. be mirrors or internal mirrors in optical equipment, lighting components or thermal radiators.

In the case e.g. of rolled products such as foils, strips or sheets or in the case of fins with an aluminium layer the individual coatings—or advantageously all of the coatings—are deposited or precipitated in continuous processes, as a rule in so called strip-coating or coil coating processes. The processes used for the anodic oxidation of aluminium may e.g. be employed to create layer a). also layer b) the functional layer such as a sol-gel layer, may be deposited in a continuous process, whereby the sol is deposited on the surface to be treated by immersion, spraying or by coil coating and subsequently dried or cured in a continuous oven by radiation and/or thermal treatment. Finally layer c) or the multilayer system may be deposited by evaporisation, sputtering—in each case in particular in vacuum—etc.

The reflectors according to the present invention exhibit e.g. a 5 to 50% better reflectivity. The reflectors, e.g. in the form of foils, strips or sheets can also be shaped without showing hardly any cracks. The reflectors according to the invention exhibit good resistance towards chemical, physical and in particular mechanical deterioration such as mechanical damage, wear, corrosion etc. Sources of mechanical damage could be e.g. on cleaning the surfaces i.e. the reflective layers, dust, sand and the like which become trapped between the cleaning equipment and the surface or by the cleaning equipment itself i.e. cloth, wiper, brush etc. Corrosion could originate from moisture, gases or vapours which attack the surface or penetrate below the layers and delaminate them or alter them chemically.

The present invention includes also the use of reflectors having a surface resistant to mechanical and chemical attack and high total reflectivity for the reflection of radiation in the optical range i.e. daylight and artificial light, thermal radiation, visible light, ultraviolet light etc. Of particular importance is the use of the reflectors for reflecting visible light in particular daylight or artificial light, including UV light. The reflectors according to the invention are e.g. suitable as reflectors or lighting elements for lighting and technical lighting purposes such as e.g. reflectors in work-place lighting, primary lighting, secondary lighting, strip lighting with transvers reflectors, lighting elements or as light deflecting elements etc.

DETAILED DESCRIPTION OF THE DRAWING

Figure 1:
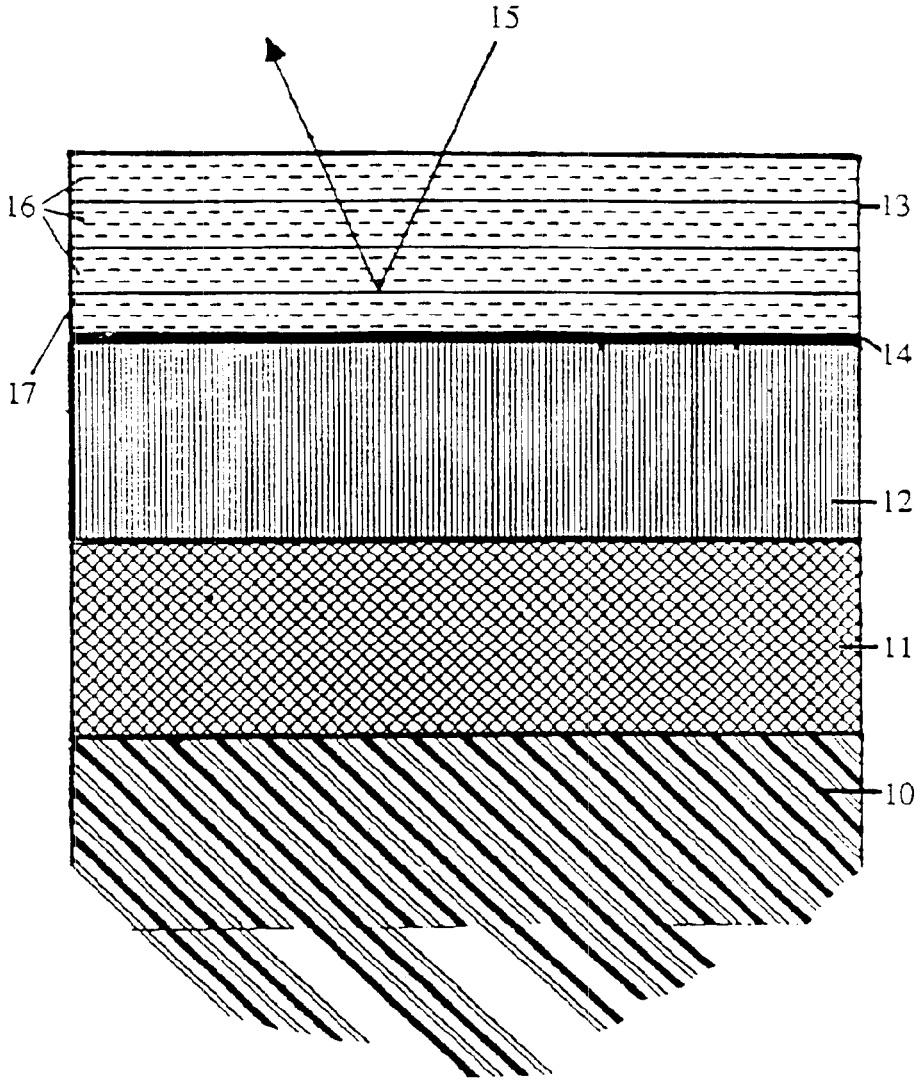
FIG. 1 shows schematically a section through a reflector according to the invention.

In FIG. 1, situated on a reflector body (10)—for example strip material of metal such as aluminium—is a surface layer in the form of a layer system comprising a pretreatment layer (11), a functional layer (12) and a metallic reflective layer (13). The pre-treatment layer (11) may be formed directly from the material of the reflector body (10) by anodic oxidation. The surface of the pre-treatment layer (11) facing the functional layer (12) may exhibit some roughness. The functional layer (12) is able to even out this roughness and form a smooth surface for deposition of the metallic reflective layer (13). The metallic reflective layer (13), or layer system comprising metal reflecting layer (17) and protective layers (16), is deposited on the functional layer (12). A ray of light (15) penetrates the transparent protective layers (16), which are sketched in here and are in particular transparent, and is reflected by the metal reflecting layer (17). In some cases a bonding layer (14) may be provided between the functional coating (12) and the metal reflective layer (13).

Example

1. A pre-treatment layer is deposited on an aluminium strip in a continuous process. For that purpose an aluminium strip (Al 99.8, Ra 0.08 μm), 500 mm wide and 0.3 mm thick is continuously anodised at 40 m/min. In that process the strip is exposed to the following treatments:

a) Degreasing at pH 9–9.5, at approx. 50° C. and bonder V6150/01, b) rinsing with tap water (room temperature), c) anodising in 20% $H_2SO_4$ at 85° C. and 20V, d) rinsing in tap water at 50° C. and e) rinsing in deionised water at approx. 85° C.

The strip bearing the pre-treatment layer, in the present example the pre-anodised strip, is coated with the functional layer at 40 m/min in a coil coating process and counter-flowing immersion and deposition rolls and dried in a continuous oven at an oven temperature of 200 to 250° C. for approx. 10 to 15 sec. The temperature of the metal (measured using thermoelements on the non-coated substrate) was between 195 and 216° C.

The rinsed strip showed no signs of interlocking and exhibited a hardness of 2H–3H measured according to the method "Pencil test after Wolf Wilburn" SNV 37113, SIS 18 41 87, NEN 5350, MIL C 27 227, ECCA test methods, at a layer thickness of 5 μm.

The bond strength was measured according to the cross-hatch test (ISO 2409). After folding, the layer exhibited regular cracks parallel to the knee of folding, but no signs of delamination.

The strip, after coating with the functional coating using the soil-gel process is provided with a PVD reflectivity enhancing coating (Antiflex B® of Balzers) and exhibits the following reflectivity values acc. to DIN 5036 Part 3:

Total reflectivity>95% and scattered reflectivity<1%.

The PVD layer is securely attached to the substrate and does not free itself from the functional coating even after pronounced deformation by e.g. folding.

We claim:

1. A reflector, having a surface which is resistant to mechanical and chemical attack and has high total reflectivity, wherein the metal body (10) of the reflector has a surface layer in the form of a layer system comprising:

(A) a pretreatment layer (11), which is (i) an oxide layer produced by anodizing with forming in a redissolving or non-redissolving electrolyte, or (ii) a yellow chromate layer, a green chromate layer, a phosphate layer or a chrome-free layer formed in an electrolyte containing at least one of the elements Ti, Zr, F, Mo and Mn, onto which is deposited:

(B) a functional layer (12) of a silane, having at least one organo-functional group of a metal compound, and said functional layer comprising one or more layers of materials which have been obtained by hydrolytic condensation, optionally in the presence of a condensation catalyst and/or normal additives, of the following starting components:

(a) at least one cross-linkable silane, having at least one organo-functional group, of formula (II):

$$R'''_m SiX_{(4-m)} \quad \text{(II)}$$

in which groups X, which are the same or different, stand for hydrogen, halogen, alkoxy, acyloxy, alkylcarbonyl or —$NR''_2$, wherein each R" is hydrogen or alkyl, and the radicals R'", which are the same or different, represent alkyl, alkenyl, alkinyl, aryl, arylalkyl, alkylaryl, arylalkenyl, alkenylaryl, arylalkinyl or alkinylaryl, whereby these radicals can be interrupted by O- or —S atoms or the group —NR" and optionally bear one or more substituents from the group consisting of halogens and optionally substituted amino, amide, aldehyde, keto, alkylcarbonyl, carboxy, mercapto, cyano, hydroxy, alkoxy, alkoxycarbonyl, sulfonic acid, phosphoric acid, acryloxy, methacryloxy, epoxy and vinyl groups, and m has the value 1, 2 or 3, and/or one oligomer derived therefrom, where the radical R'" and/or the substituted must be a cross-linkable radical or substituent, in an amount of 10 to 95 mol percent, referred to the total mol number of monomers of said starting components;

(b) at least one metal compound having the general formula III:

$$MeR_y \quad \text{(III)}$$

in which Me is Al, Zr or Ti metal, where y in the case of aluminum is 3 and in the case of Ti and Zr is 4, and the radicals R, which are the same or different, stand for halogen, alkyl, alkoxy, acyloxy or hydroxy, where the last mentioned groups are replaced wholly or partially by chelate ligands and/or one oligomer derived therefrom and/or optionally a complexed aluminum salt of an inorganic or organic acid in an amount of 5 to 75 mol percent, referred to the total mol number of monomers of said starting components, (c) optionally at least one non cross-linkable silane, having at least one organo-functional group, of formula I:

$$R'_m SiX_{(4-m)} \quad \text{(I)}$$

in which groups X, which are the same or different, stand for hydrogen, halogen, hydroxy, alkoxy, acyloxy, alkylcarbonyl, alkoxycarbonyl or —$NR''_2$, wherein each R" is hydrogen or alkyl, and the radicals R', which are the same or different, represent alkyl, aryl, arylalkyl or alkylaryl, whereby these radicals can be interrupted by O- or S-atoms or the group —NR" and can bear one or more substituents from the group consisting of halogens and optionally substituted amide, aldehyde, keto, alkylcarbonyl, carboxy, cyano, alkoxy and alkoxycarbonyl groups, and m has the value 1, 2 or 3, and/or one oligomer derived therefrom, in an amount of 0 to 60 mol percent, referred to the total mol number of the monomers of said starting components, and (d) optionally one or more non-volatile oxides of an element of the main groups Ia to Va or sub-groups IIb, IIIb and Vb to VIIb of the periodic system which is soluble in the reaction medium, with the exception of Al, and/or one or more compounds of one of these elements forming a non-volatile oxide under the reaction conditions, which is soluble in the reaction medium, in an amount of 0 to 70 mol percent, referred to the total mol number of monomers of said starting components, carried out such that:

(1) an organic prepolymer is added to this hydrolytic condensate, whereby reacting cross-linkable groups of the radical R'" and/or the cross-linkable substitutes on the radical R'" are linkable to those of the prepolymer or are identical to those of the prepolymer, and the prepolymer is added in an amount of 2 to 70 mol percent, referred to the total mol number of monomers of said starting components, and (2) the coating solution thus obtained is deposited on a substrate and subsequently cured, onto which is deposited:

(C) a metal containing reflective layer (13), where layer (A) is deposited on the reflector body and increases the strength of bonding to the above lying layers (B) and (C), and layer (B) effects a flattening and increase in the mechanical strength of the above lying layer (C).

2. The reflector according to claim 1, wherein the pretreatment layer (A) has a thickness in the range of 20 to 1500 nanometers.

3. The reflector according to claim 1, wherein the pretreatment layer (A) has a thickness in the range of 50 to 1500 nanometers.

4. The reflector according to claim 1, wherein the pretreatment layer (A) has a thickness in the range of 100 to 1500 nanometers.

5. The reflector according to claim 1, wherein the pretreatment layer (A) has a thickness in the range of 150 to 1500 nanometers.

6. The reflector according to claim 1, wherein the pretreatment layer (A) has a thickness in the range of 20 to 200 nanometers.

7. The reflector according to claim 1, wherein the functional layer (B) is 0.5 to 20 μm thick.

8. The reflector according to claim 1, wherein the functional layer (B) is 1 to 20 μm thick.

9. The reflector according to claim 1, wherein the functional layer (B) is 2 to 10 μm thick.

10. The reflector according to claim 1, wherein the functional layer (B) is 2 to 5 μm thick.

11. The reflector according to claim 1, wherein the functional layer (B) is composed of a single layer or a multiple layer and the multiple layers are all of the same material or of different materials, in each case being selected from the materials in the functional layer (B).

12. The reflector according to claim 1, wherein the reflective layer (C) is a multilayer system comprising a reflecting layer and deposited on that transparent protective layers with different refractive indices.

13. The reflector according to claim 1, wherein the reflective layer (C) is a multilayer system comprising a reflecting layer and deposited thereon transparent protective layers with different refractive indices, the reflective layer being 10 to 200 nm thick and each of the transparent protective layers being 40 to 200 nm thick.

14. The reflector according to claim 1, wherein the reflective layer (C) is or contains a metal from the series Al, Ag, Cu, Au, Cr, Ni or an alloy containing mainly at least one of these metals.

15. The reflector according to claim 1, wherein a bonding layer is provided between the functional layer (B) and the reflective layer (C).

* * * * *